United States Patent
Chen et al.

(10) Patent No.: US 12,061,118 B2
(45) Date of Patent: Aug. 13, 2024

(54) CALIBRATION APPARATUS, SYSTEM AND METHOD FOR IN-VEHICLE CAMERA

(71) Applicant: AUTEL INTELLIGENT TECHNOLOGY CORP., LTD., Guangdong (CN)

(72) Inventors: Yong Chen, Guangdong (CN); Xinguang Tang, Guangdong (CN); Xiaolong Wang, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 939 days.

(21) Appl. No.: 17/072,907

(22) Filed: Oct. 16, 2020

(65) Prior Publication Data
US 2021/0033467 A1 Feb. 4, 2021

Related U.S. Application Data

(63) Continuation of application No. PCT/CN2019/082959, filed on Apr. 17, 2019.

(30) Foreign Application Priority Data

Apr. 17, 2018 (CN) .......................... 201820545417.X

(51) Int. Cl.
*G01J 5/00* (2022.01)
*B60R 16/00* (2006.01)
(Continued)

(52) U.S. Cl.
CPC .............. *G01J 5/00* (2013.01); *B60R 16/005* (2013.01); *B60R 16/03* (2013.01); *G06T 7/80* (2017.01);
(Continued)

(58) Field of Classification Search
CPC .... G01K 15/002; G01K 15/005; G01K 15/00; G01J 5/00; G01J 5/532; G06T 7/80;
(Continued)

(56) References Cited

U.S. PATENT DOCUMENTS

| | | | |
|---|---|---|---|
| 6,418,775 B1 * | 7/2002 | Sager | ..................... G01S 7/4972 73/1.79 |
| 2004/0066965 A1 | 4/2004 | Watanabe et al. | |

(Continued)

FOREIGN PATENT DOCUMENTS

| CN | 101075712 A | | 11/2007 |
|---|---|---|---|
| CN | 101482410 A | * | 7/2009 |

(Continued)

OTHER PUBLICATIONS

17072907_2023-09-08_JP_2012167944_A_H.pdf,Sep. 6, 2012.*
(Continued)

*Primary Examiner* — Gail Kaplan Verbitsky

(57) ABSTRACT

The present invention provides a calibration apparatus, system and method for an in-vehicle camera. The calibration apparatus for an in-vehicle camera includes: a body, where at least one distinctive mark arranged at intervals along a first direction and at least one heating member arranged at intervals along a second direction are disposed on the body. The distinctive mark is configured to be recognized by a common camera, and the heating member is configured to generate heat so as to be recognized by an infrared camera. According to the calibration apparatus, system and method for an in-vehicle camera provided in the present invention, during calibration, a common camera can recognize the distinctive mark, and therefore, the common camera can be calibrated; the heating member may generate heat so as to be recognized by an infrared camera, and therefore, the infrared camera is calibrated. In this way, the common camera and the infrared camera can be calibrated simultaneously in one (Continued)

calibration operation; the operation is simple and convenient.

19 Claims, 8 Drawing Sheets

(51) Int. Cl.
*B60R 16/03* (2006.01)
*G06T 7/80* (2017.01)
*H04N 5/33* (2023.01)
*B60R 11/00* (2006.01)
*B60R 11/04* (2006.01)
*G01J 5/53* (2022.01)
*G01J 5/80* (2022.01)

(52) U.S. Cl.
CPC ........ *H04N 5/33* (2013.01); *B60R 2011/0003* (2013.01); *B60R 11/04* (2013.01); *G01J 5/532* (2022.01); *G01J 5/80* (2022.01); *G06T 2207/10048* (2013.01); *G06T 2207/30204* (2013.01)

(58) Field of Classification Search
CPC . G06T 2207/10048; G06T 2207/30204; B60R 16/005; B60R 16/03; B60R 11/04; B60R 2011/0003; H04N 5/33
USPC .................................... 374/1, 2, 141; 702/99
See application file for complete search history.

(56) References Cited

U.S. PATENT DOCUMENTS

| | | | |
|---|---|---|---|
| 2009/0201376 A1 | 8/2009 | Bauer et al. | |
| 2010/0082281 A1* | 4/2010 | Nakamura | G06T 7/80 702/95 |
| 2013/0286219 A1* | 10/2013 | Yeh | G06T 7/80 348/E17.002 |
| 2019/0285729 A1* | 9/2019 | Tietze | G01S 7/4026 |
| 2021/0056726 A1* | 2/2021 | Oyaizu | H04N 17/002 |
| 2021/0303898 A1* | 9/2021 | Wang | G06V 20/10 |

FOREIGN PATENT DOCUMENTS

| | | | | | |
|---|---|---|---|---|---|
| CN | 102692213 | A | * | 9/2012 | |
| CN | 104374547 | A |   | 2/2015 | |
| CN | 104375375 | A |   | 2/2015 | |
| CN | 104408729 | A |   | 3/2015 | |
| CN | 104408729 | A | * | 3/2015 | ........... G06T 7/0018 |
| CN | 10479704 | A |   | 7/2015 | |
| CN | 104843287 | A |   | 8/2015 | |
| CN | 1105953748 | A | * | 8/2016 | |
| CN | 105953748 | A | * | 9/2016 | ........... G01B 11/254 |
| CN | 106405526 | A |   | 2/2017 | |
| CN | 107067442 | A |   | 8/2017 | |
| CN | 107449461 | A |   | 12/2017 | |
| CN | 206695030 | U |   | 12/2017 | |
| CN | 206773763 | U |   | 12/2017 | |
| CN | 107788578 | A |   | 3/2018 | |
| CN | 107884073 | A |   | 4/2018 | |
| CN | 107884073 | A | * | 4/2018 | |
| CN | 107884073 | A |   | 4/2018 | |
| CN | 207557463 | U | * | 6/2018 | |
| CN | 108335334 | A |   | 7/2018 | |
| CN | 208298251 | U |   | 12/2018 | |
| CN | 112562012 | A | * | 3/2021 | ............... G06T 7/80 |
| CN | 116012462 | A | * | 4/2023 | |
| DE | 102006038423 | A1 |   | 2/2008 | |
| DE | 102013021616 | A1 | * | 6/2015 | ........... G06T 7/0018 |
| DE | 102018203941 | A1 | * | 9/2019 | ........... G01S 13/931 |
| DE | 102021000725 | A1 |   | 4/2021 | |
| DE | 102021002794 | A1 |   | 7/2021 | |
| EP | 1001274 | A1 | * | 5/2000 | ........... G01S 7/4026 |
| JP | 3093083 | U |   | 4/2003 | |
| JP | 3551920 | B2 | * | 8/2004 | ............. G01S 11/12 |
| JP | 2005016979 | A | * | 1/2005 | |
| JP | 2007256030 | A | * | 10/2007 | |
| JP | 2007261463 | A | * | 10/2007 | ......... G06K 9/00791 |
| JP | 2010085186 | A | * | 4/2010 | ........... G06T 7/0018 |
| JP | 2010103730 | A | * | 5/2010 | |
| JP | 2012167944 | A | * | 9/2012 | |
| JP | 6776202 | B2 | * | 10/2020 | ......... G06K 9/00791 |
| WO | WO-2012029049 | A2 | * | 3/2012 | ............. A61B 1/00144 |
| WO | WO-2015115669 | A1 | * | 8/2015 | ............. B60R 11/04 |
| WO | WO-2016174659 | A1 | * | 11/2016 | ............. G06F 1/163 |
| WO | WO-2019138646 | A1 | * | 7/2019 | ................ G01J 5/02 |
| WO | WO-2019170066 | A1 | * | 9/2019 | ............... G06T 7/80 |

OTHER PUBLICATIONS

17072907_2024-01-11_JP_2007261463_A_H.pdf,Jun. 29, 2018.*
17072907_2023-09-08_CN_102692213_A_H.pdf,Sep. 26, 2012.*
17072907_2024-01-11_JP_2010085186_A_H.pdf,Apr. 15, 2010.*
17072907_2023-09-08_WO_2015115669_A1_H.pdf,Aug. 6, 2015.*
17072907_2024-01-11_JP_2010103730_A_H.pdf,Oct. 4, 2007.*
17072907_2023-09-08_DE_102018203941_A1_H.pdf,Sep. 19, 2019.*
17072907_2024-01-11_JP_3551920_B2_H.pdf,Aug. 11, 2004.*
17072907_2023-09-08_CN_207557463_U_H.pdf,Jun. 29, 2018.*
17072907_2024-01-11_JP_6776202_B2_H.pdf,Oct. 28, 2020.*
17072907_2023-09-08_CN_116012462_A_H.pdf,Apr. 25, 2023.*
17072907_2024-01-12_JP_2005016979_A_H.pdf.*
17072907_2023-09-08_WO_2019138646_A1_H.pdf,Jul. 18, 2019.*
17072907_2023-09-08_CN_101482410_A_H.pdf,Jul. 15, 2009.*
17072907_2024-01-11_JP_2005016979_A_H.pdf,Jan. 20, 2005.*
17072907_2023-09-08_CN_105953748_A_H.pdf,Sep. 21, 2016.*
17072907_2024-01-11_JP_2007256030_A_H.pdf,Oct. 4, 2007.*
17072907_2024-01-11_CN_104408729_A_H.pdf,Mar. 11, 2015.*
17072907_2024-01-22_WO_2016174659_A1_H.pdf,Nov. 3, 2016.*
17072907_2024-01-22_WO_2012029049_A2_H.pdf,Mar. 8, 2012.*
17072907_2024-03-25_CN_107884073_A_H.pdf,Apr. 6, 2018.*
17072907_2024-03-25_CN_112562012_A_H.pdf,Mar. 26, 2021.*
17072907_2024-03-25_DE_102013021616_A1_H.pdf,Jun. 25, 2015.*
17072907_2024-03-25_DE_102021000725_A1_H.pdf,Apr. 22, 2021.*
17072907_2024-03-25_DE_102021002794_A1_H.pdf,Jul. 15, 2021.*
17072907_2024-03-25_WO_2019170066_A1_H.pdf,Sep. 12, 2019.*
International Search Report mailed Jul. 17, 2019; PCT/CN2019/082959.
The 3rd Chinese Office Action dated Jun. 28, 2023; Appln. No. 201810344249.2 (No English Translation available on Global Dossier).

* cited by examiner

CALIBRATION APPARATUS, SYSTEM AND METHOD FOR IN-VEHICLE CAMERA

This application is a continuation application of International Application No. PCT/CN2019/082959, filed on Apr. 17, 2019, which claims priority of Chinese Patent Application No. 201820545417.X, filed on Apr. 17, 2018, which is incorporated herein by reference in its entirety.

BACKGROUND

Technical Field

The present application relates to the field of automotive technology, and in particular, to a calibration apparatus, system and method for an in-vehicle camera.

Related Art

As a vehicle assistant system, a night vision system can provide support to a driver at night, to help the driver to be aware of danger in advance. The night vision system can display potential hazards out of an irradiation range of headlights at night, to avoid a traffic accident. Besides, the night vision system can further help the driver to see the condition in front when a dazzling glare occurs during meeting of vehicles at night.

In the prior art, the night vision system generally recognizes a front person or object based on a camera apparatus. The camera apparatus is generally disposed in the front of a vehicle body, and may include a common camera and an infrared camera. The common camera can recognize the front person or object according to a principle of image recognition; and the infrared camera can recognize whether there is a passerby around the vehicle by using a principle of infrared thermal imaging.

However, when the camera apparatus fails, alignment and calibration need to be performed on the camera apparatus again. In the prior art, generally, a common camera calibration apparatus is used to calibrate the common camera, and then an infrared camera calibration apparatus is used to calibrate the infrared camera. The operation is complex, time-consuming and arduous.

SUMMARY

The present invention provides a calibration apparatus, system and method for an in-vehicle camera, to resolve the problem of complex operation for calibrating a camera apparatus in the prior art.

The present invention provides a calibration apparatus for an in-vehicle camera, including: a body, where at least one distinctive mark arranged at intervals along a first direction and at least one heating member arranged at intervals along a second direction are disposed on the body. The distinctive mark is configured to be detected by a common camera, and the heating member is configured to generate heat so as to be detected by an infrared camera.

In the calibration apparatus described above, the distinctive mark is a ring-shaped structure.

In the calibration apparatus described above, the first direction and the second direction are the same.

In the calibration apparatus described above, the body includes a housing and a covering plate covered on the housing, the covering plate and the housing forming an accommodating cavity after being connected. The distinctive mark is disposed on an external surface, away from the accommodating cavity, of the covering plate. The heating member is fixed in the accommodating cavity. Through holes arranged along the second direction are formed on the covering plate. Each through hole corresponds to one heating member, and each heating member corresponds to one through hole. Heat of the heating member is sent out through the through hole corresponding to the heating member.

In the calibration apparatus described above, the through hole is a circular hole.

In the calibration apparatus described above, a waterproof transparent film is disposed in the through hole.

In the calibration apparatus described above, a waterproof transparent film covering the through hole is disposed on a surface of the covering plate.

In the calibration apparatus described above, the body further includes a fixing base. The fixing base is accommodated in the accommodating cavity. The fixing base is provided with a connecting portion and a mounting portion. The mounting portion is configured to connect the heating member. The connecting portion is configured to connect the mounting portion and the body.

In the calibration apparatus described above, the connecting portion is fixedly connected to the covering plate; or the connecting portion is fixedly connected to the housing.

In the calibration apparatus described above, the connecting portion includes a connecting screw, the connecting portion and the body being connected by using a first bolt.

In the calibration apparatus described above, the mounting portion includes a groove configured to accommodate the heating member.

In the calibration apparatus described above, the groove includes two side walls arranged opposite to each other and a bottom wall. The heating member is fixedly connected to the groove.

In the calibration apparatus described above, the groove is provided with a limiting portion. The limiting portion is configured to prevent the heating member from being in contact with the bottom wall.

In the calibration apparatus described above, the limiting portion is disposed on the bottom wall. A length of the limiting portion is less than a length of the bottom wall. The heating member is connected to the limiting portion.

In the calibration apparatus described above, two ends of the bottom wall are each provided with one limiting portion; one side of the limiting portion is connected to one side wall of the two side walls arranged opposite to each other.

In the calibration apparatus described above, a length of the side of the limiting portion is less than a length of the side wall.

In the calibration apparatus described above, each side wall is provided with a threaded through hole, a second bolt passes through the threaded through hole, and an end of a screw rod of the second bolt abuts against a surface of the heating member.

In the calibration apparatus described above, the body further includes a power supply unit, the power supply unit being connected to the heating member through an electrical connection wire.

In the calibration apparatus described above, the body further includes a switch respectively connected to the power supply unit and the heating member, the switch being configured to control a working state of the heating member.

In the calibration apparatus described above, the power supply unit includes a power source or a power source interface. The power source interface is configured to connect an external power source, to allow the external power source to supply power to the heating member.

In the calibration apparatus described above further includes a base fixedly connected to the body, the base being disposed perpendicular to the body, so that the body is perpendicular to a horizontal plane.

In the calibration apparatus described above, the base includes a level adjustment apparatus configured to adjust a level angle of the base.

In the calibration apparatus described above, the base further includes a gradienter, which is mounted on the base and configured to detect whether the base is disposed horizontally.

In the calibration apparatus described above, the level adjustment apparatus includes a handle and a screw rod portion. The handle is mounted at an end of the screw rod portion, the handle being located above the base, for ease of rotating the level adjustment apparatus. The screw rod portion passes through the base, the screw rod portion fitting with threads of the base and being vertically disposed.

In the calibration apparatus described above, the heating member is a positive temperature coefficient (PTC) heating member.

The present invention further provides a calibration system for an in-vehicle camera, including a vehicle and the calibration apparatus for an in-vehicle camera described above. A common camera and an infrared camera are disposed in the vehicle. The calibration apparatus for an in-vehicle camera is fixed at a preset distance in front of the vehicle along a driving direction. The distinctive mark and the heating member are disposed toward the vehicle.

The present invention further provides a calibration method for an in-vehicle camera, applied to the calibration system for an in-vehicle camera described above, including: placing a calibration apparatus for an in-vehicle camera at a preset distance in front of a front bumper of a to-be-detected vehicle, so that a surface, including a distinctive mark and a heating member, of the calibration apparatus for an in-vehicle camera faces the front bumper of the to-be-detected vehicle; calibrating a common camera in the to-be-detected vehicle by using the distinctive mark; and controlling the heating member to generate heat, and when temperature of the heating member is greater than or equal to a preset temperature threshold, calibrating an infrared camera in the to-be-detected vehicle.

According to the calibration apparatus, system and method for an in-vehicle camera provided in the present invention, at least one distinctive mark arranged at intervals along a first direction and at least one heating member arranged at intervals along a second direction are disposed on the body. During calibration, a common camera can detect the distinctive mark, and therefore, the common camera is calibrated; the heating member may generate heat so as to be detected by an infrared camera, and therefore, the infrared camera is calibrated. In this way, the common camera and the infrared camera may be calibrated simultaneously in one calibration operation; the operation is simple and convenient.

BRIEF DESCRIPTION OF THE DRAWINGS

Specific implementations of the present invention are described below in detail with reference to accompanying drawings. It should be understood that the specific implementations described herein are merely used for describing and explaining the present invention, and the present invention is not limited to the following specific implementations.

DESCRIPTION OF NUMERICAL REFERENCE

1: Body; 11: Housing;
12: Covering plate; 121: Through hole;
2: Distinctive mark; 3: Heating member;
4: Fixing base; 41: Connecting screw hole;
42: Groove; 421; Side wall;
4211: Threaded through hole; 422: Bottom wall;
423: Limiting portion; 5: Base;
6: Level adjustment apparatus; 61: Handle;
62: Screw rod portion; 31: Upper surface of heating member; and
32: Lower surface of heating member.

DETAILED DESCRIPTION

As a vehicle assistant system, a night vision system can provide support to a driver at night, to help the driver to be aware of danger in advance. The night vision system can display potential hazards out of an irradiation range of headlights at night, to avoid a traffic accident. Besides, the night vision system can further help the driver to see the condition in front when a dazzling glare occurs during meeting of vehicles at night.

In the prior art, the night vision system generally detects a front person or object based on a camera apparatus. The camera apparatus is generally disposed in the front of a vehicle body, and the camera apparatus may include a common camera 011 and an infrared camera 012, The common camera 011 can detect the front person or object according to a principle of image recognition; and the infrared camera 012 can detect whether there is a passerby around the vehicle by using a principle of infrared thermal imaging.

However, when the camera apparatus fails, alignment and calibration need to be performed on the camera apparatus again. In the prior art, generally, a common camera calibration apparatus is used to calibrate the common camera, and then an infrared camera calibration apparatus is used to calibrate the infrared camera. The operation is complex, time-consuming and arduous.

To resolve the foregoing problem, embodiments of the present invention provide a calibration apparatus, system and method for an in-vehicle camera, to calibrate a common camera and an infrared camera simultaneously, and simplify the calibration operation.

Specific implementations of the present invention are described below in detail with reference to the accompanying drawings. It should be understood that the specific implementations described herein are merely used for describing and explaining the present invention, and the present invention is not limited to the following specific implementations.

Figure 1:
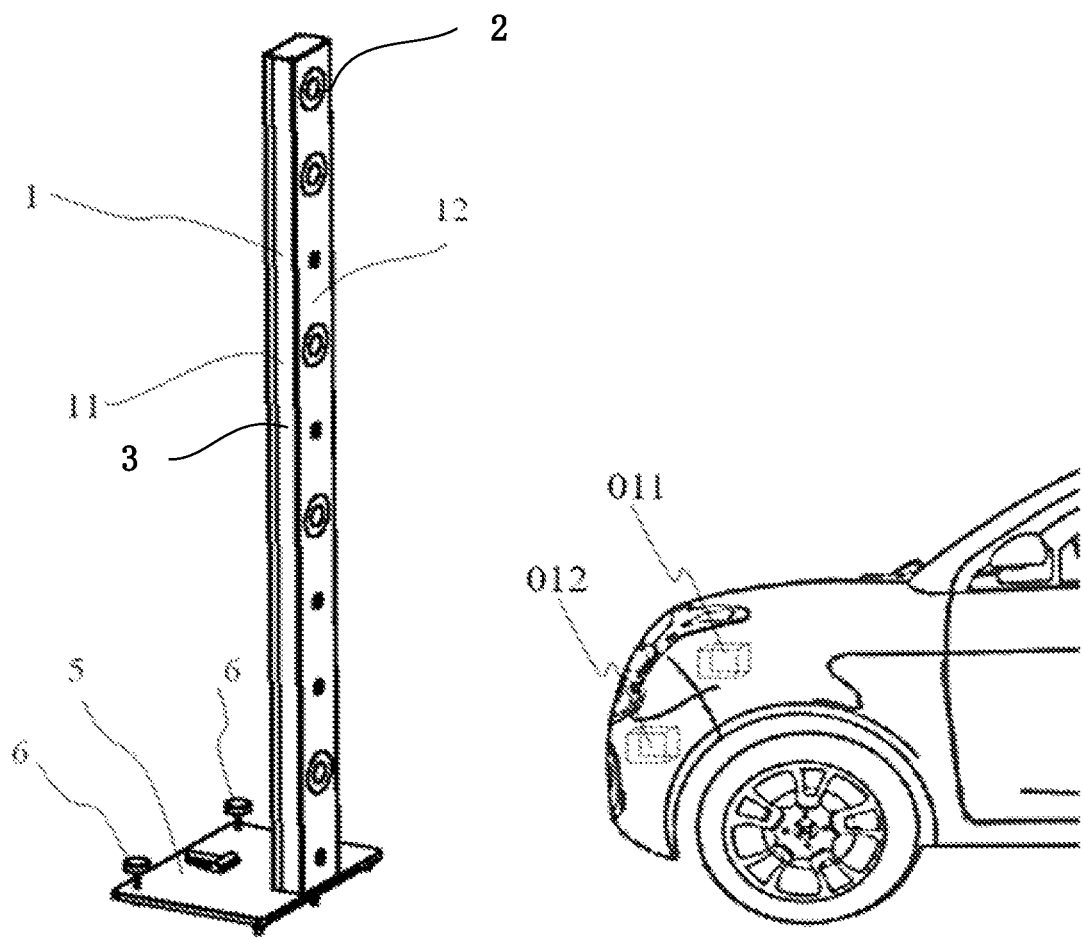
FIG. 1 is an overall schematic structural diagram of a calibration apparatus for an in-vehicle camera according to the present invention.
Figure 2:
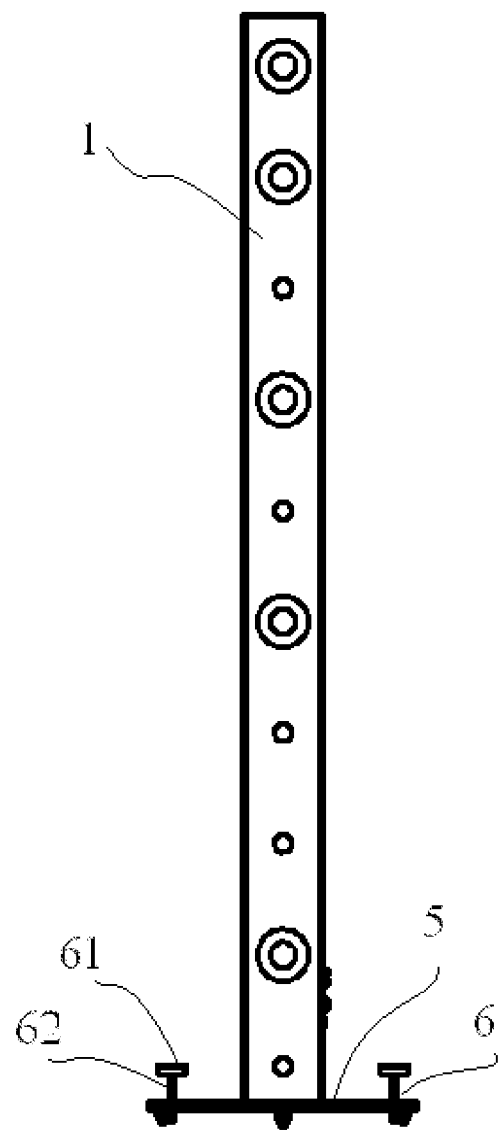
FIG. 2 is a front view of FIG. 1.
Figure 3:
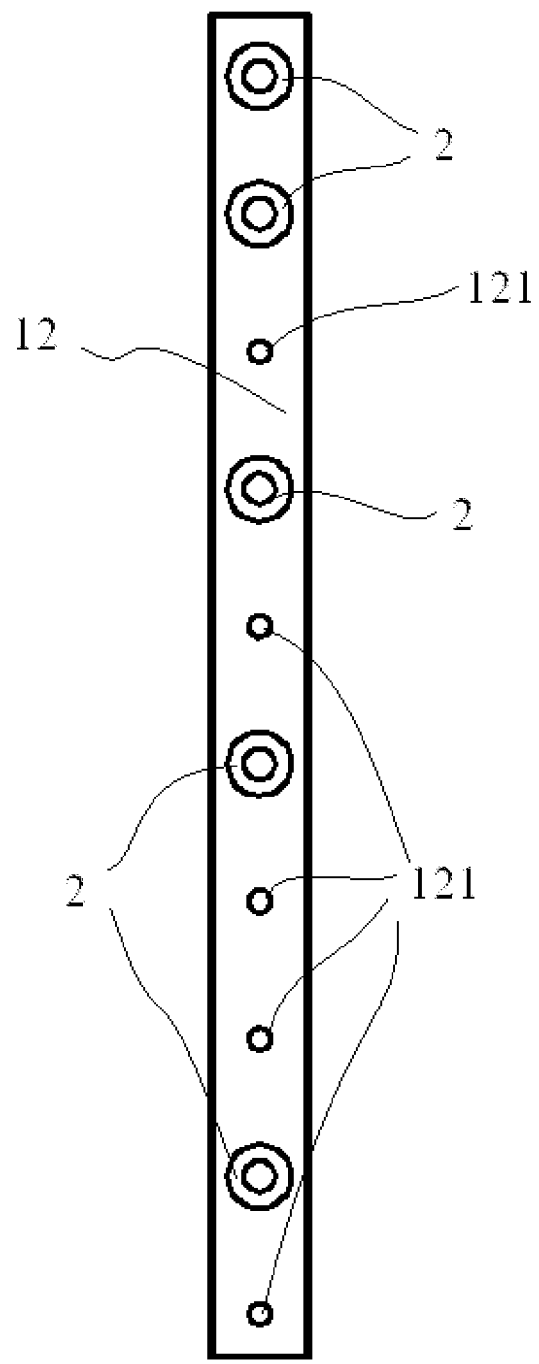
FIG. 3 is a front view of a covering plate in FIG. 1.
Figure 4:
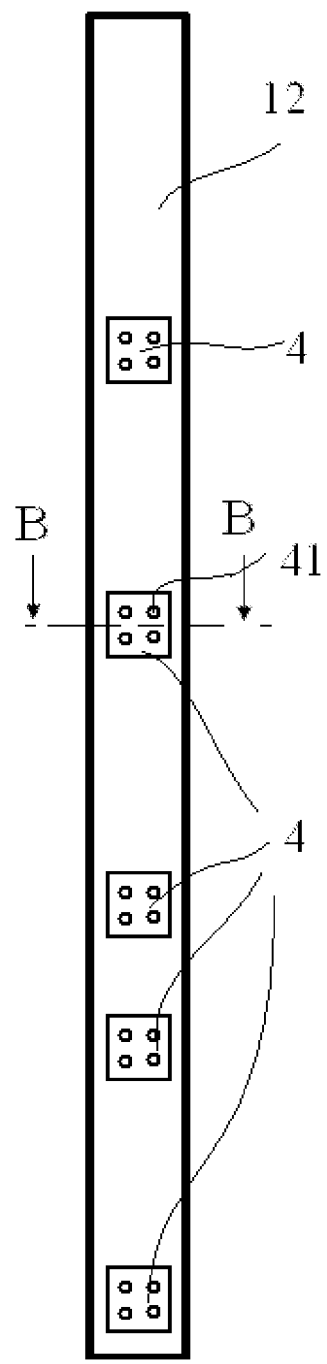
FIG. 4 is a rear view of the covering plate in FIG. 1.
Figure 5:
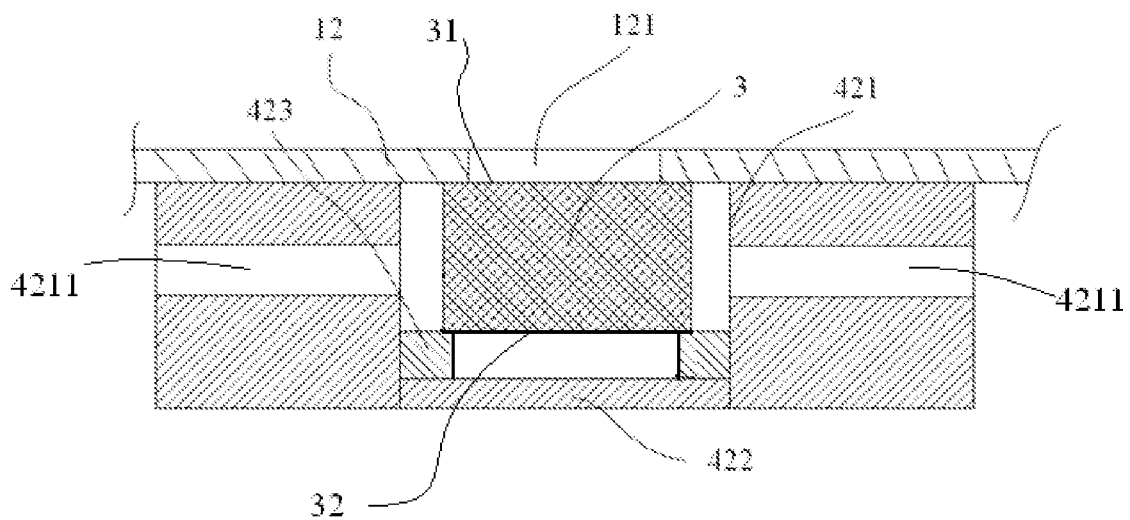
FIG. 5 is a partial cross-sectional view along a B-B direction in FIG. 4.
Figure 6:
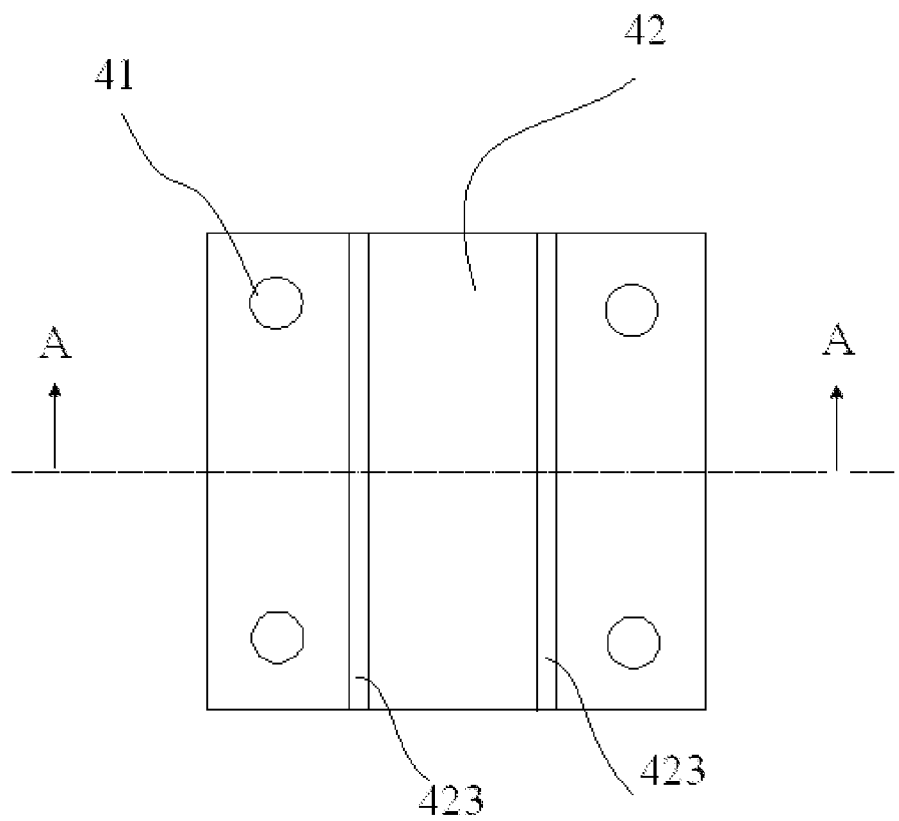
FIG. 6 is an overall schematic structural diagram of a fixing base in FIG. 4.
Figure 7:
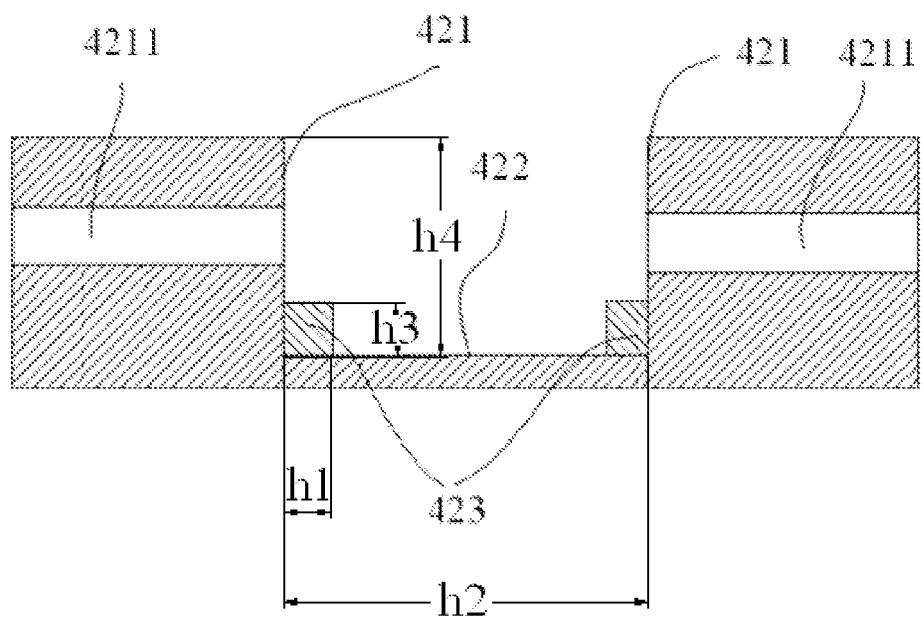
FIG. 7 is a cross-sectional view along an A-A direction in FIG. 6.
Figure 8:
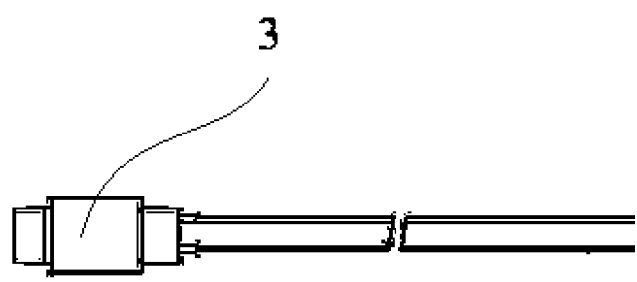
FIG. 8 is a top view of a heating member in FIG. 5.
Figure 9:
FIG. 9 is a front view of the heating member in FIG. 5.

FIG. 1 is an overall schematic structural diagram of a calibration apparatus for an in-vehicle camera according to the present invention; FIG. 2 is a front view of FIG. 1; FIG. 3 is a front view of a covering plate in FIG. 1; FIG. 4 is a rear view of the covering plate in FIG. 1; FIG. 5 is a partial cross-sectional view along a B-B direction in FIG. 4; FIG. 6 is an overall schematic structural diagram of a fixing base in FIG. 4; FIG. 7 is a cross-sectional view along an A-A direction in FIG. 6; FIG. 8 is a top view of a heating member in FIG. 5; and FIG. 9 is a front view of the heating member in FIG. 5.

With reference to FIG. 1 to FIG. 9, a calibration apparatus for an in-vehicle camera provided in this embodiment includes: a body 1, where at least one distinctive mark 2 arranged at intervals along a first direction and at least one heating member 3 arranged at intervals along a second direction are disposed on the body 1. The distinctive mark 2 is configured to be detected by a common camera 011, and the heating member 3 is configured to generate heat so as to be detected by an infrared camera 012.

Specifically, the calibration apparatus for an in-vehicle camera may be configured to calibrate and align an in-vehicle camera of a vehicle, and in particular, may be configured to calibrate a vehicle including a common camera 011 and an infrared camera 012. The calibration apparatus for an in-vehicle camera may include the body 1, the distinctive mark 2 that can be detected by a common camera 011 and the heating member 3 that can be detected by an infrared camera 012 being disposed on the body 1.

As a main structure of the calibration apparatus for an in-vehicle camera, the body 1 may be of various structures. For example, the body 1 may be of a frame-shaped structure composed of a plurality of beams. For another example, the body 1 may be of a hollow thin-wall-shaped structure, or the like. A shape and a size of the body 1 may be set according to an actual detection situation. Preferably, a size of the body 1 in a length direction may be greater than a size in a width direction, so that the body 1 is of a strip-shaped structure. In addition, the size in the length direction may be approximately equal to a height of a human body, thereby facilitating the in-vehicle camera of the vehicle to detect a human body.

As a main structure of the calibration apparatus for an in-vehicle camera, the body 1 may be of various structures. For example, the body 1 may be of a frame-shaped structure composed of a plurality of beams. For another example, the body 1 may be of a hollow thin-wall-shaped structure, or the like. A shape and a size of the body 1 may be set according to an actual detection situation. Preferably, a size of the body 1 in a length direction may be greater than a size in a width direction, so that the body 1 is of a strip-shaped structure. In addition, the size in the length direction may be approximately equal to a height of a human body, thereby facilitating the in-vehicle camera of the vehicle to recognize a human body.

The distinctive mark 2 is disposed on the body 1, and may be in contrast with the body 1. Therefore, the distinctive mark is recognizable by a common camera. There may be various kinds of distinctive marks 2. For example, the body 1 may be made of a light-absorbing material, and the distinctive mark 2 may be made of a light-reflecting material. For another example, a color of the distinctive mark 2 may be different from a color of the body 1. Preferably, the body 1 may be white, and the distinctive mark 2 may be black. Therefore, a strong contrast is formed between the body 1 and the distinctive mark 2, to facilitate recognition by a common camera.

A shape of the distinctive mark 2 may be set according to an actual situation. For example, the shape may be circular, square, triangular and the like, which is not specifically limited herein.

There may also be various connection manners between the distinctive mark 2 and the body 1. For example, the distinctive mark 2 may be connected to a surface of the body 1 by means of clamping or screw joint. Preferably, the distinctive mark 2 may be a sticker, and may be bonded on the body 1, which has a simple structure and is easy to implement. Alternatively, the distinctive mark 2 may be integrally connected to the body 1.

In addition, one or at least two distinctive marks 2 may be provided. N is used for representing the quantity of distinctive marks 2 hereinafter, where N is a natural number. N may be set according to an algorithm of the in-vehicle camera. For example, when a calibration algorithm of the in-vehicle camera only needs two points to determine a position of a to-be-detected object, N may be 2. When a recognition algorithm of the in-vehicle camera needs three points for determination, N may be 3. N may be specifically set according to an algorithm of an actually detected in-vehicle camera. N distinctive marks 2 may be disposed on the body 1 at intervals along the first direction, where the first direction may be a straight line direction, or may be a curved line direction. Preferably, the first direction may extend approximately along a vertical direction. A distance between two distinctive marks 2 that are farthest away from each other may be a height of a human body, thereby facilitating simulation of human body recognition. Certainly, the distance between distinctive marks 2 and a layout manner of the distinctive marks 2 on the body 1 may also be determined according to an algorithm, such as a calibration algorithm, of the to-be-detected in-vehicle camera, which is not limited herein.

The heating member 3 can generate heat to make the temperature of the heating member higher than surrounding temperature, so that the heating member is detected by an infrared camera 012. The heating member 3 may be of various structures. For example, the heating member may be a PTC heating member, a heating resistor, a carbon fiber membrane or other heating structures, which may be selected according to an actual situation.

The heating member 3 may also have various shapes, such as a square shape or a ring shape. There may also be various connection manners between the heating member 3 and the body 1. For example, the body 1 may be provided with a clamping groove for clamping the heating member 3. For another example, the heating member 3 may be provided with a mounting hole, so that a bolt can pass through the mounting hole to screw-joint the heating member 3 with the body 1.

In addition, one or at least two heating members 3 may be provided. M is used below for representing the quantity of heating members 3 hereinafter, where M is a natural number. M heating members 3 may be disposed at intervals along the second direction. The quantity of heating members 3 may be set according to an algorithm of the in-vehicle camera. For example, if a calibration algorithm of the in-vehicle camera only needs two points to determine a position of a to-be-detected object, M may be 2. When the calibration algorithm of the in-vehicle camera needs three points for determination, M may be 3. M may be specifically set according to an algorithm of an actually detected in-vehicle camera. M heating members 3 may be disposed on the body 1 at intervals along the second direction, where the first direction may be a straight line direction, or may be a curved line direction. Preferably, the second direction may extend approximately along a vertical direction. A distance between two heating members 3 that are farthest away from each other may be a height of a human body, thereby facilitating simulation of human body recognition.

Certainly, the distance between heating members 3 and a layout manner of the heating members 3 on the body 1 may also be determined according to an algorithm, such as a calibration algorithm, of the to-be-detected in-vehicle camera. This is not limited herein. In addition, M and N may be the same, or may be different from each other; the first direction may be parallel to the second direction or may intersect with the second direction, which is not specifically limited herein.

During calibration, the temperature of the body 1 is the same as the ambient temperature, while the temperature of the heating member 3 disposed on the body may be higher than the ambient temperature. The infrared camera 012 can detect the heating member 3, thereby determining a position of the body 1. The distinctive mark 2 may be different from the body 1 so as to be detected by the common camera 011, thereby determining the position of the body 1. Therefore, the calibration apparatus of the in-vehicle camera may calibrate the common camera 011 and the infrared camera 012 simultaneously.

According to the calibration apparatus for an in-vehicle camera provided in this embodiment, at least one distinctive mark arranged along the first direction and at least one heating member arranged along the second direction are disposed on the body. During calibration, a common camera 011 can detect the distinctive mark, and therefore, the common camera 011 is calibrated. The heating member may generate heat so as to be detected by an infrared camera 012, and therefore, the infrared camera 012 is calibrated. In this way, the common camera 011 and the infrared camera 012 may be calibrated simultaneously in one calibration operation; the operation is simple and convenient.

Further, the distinctive mark 2 may be a ring-shaped structure, thereby facilitating recognition by the common camera. The first direction and the second direction may be the same, that is, the first direction and the second direction may coincide with each other to form the same direction. Further, the first direction may be a vertical direction to facilitate calibration.

As a preferred embodiment of the body 1, the body 1 may include a housing 11 and a covering plate 12 covered on the housing 11. An accommodating cavity is formed after the covering plate 12 and the housing 11 are connected together. The distinctive mark 2 is disposed on an external surface, away from the accommodating cavity, of the covering plate 12. The heating member 3 is fixed in the accommodating cavity. Through holes 121 arranged along the second direction are formed on the covering plate 12. Each through hole 121 corresponds to one heating member 3, and each heating member 3 corresponds to one through hole 121. Heat of the heating member 3 is sent out through the through hole 121 corresponding to the heating member 3.

A position of the heating member 3 in the accommodating cavity is adjacent to a position of the through hole 121. For example, a setting height of the heating member 3 in the accommodating cavity is equal to a height of the corresponding through hole 121. The height of the through hole 121 may be a height of a central axis of the through hole to the ground. The central axis of the through hole 121 is perpendicular to a plane where the covering plate is located. Further, the heating member 3 may be disposed adjacent to an internal surface of the covering plate 12.

In addition, for some vehicles, the algorithm of the in-vehicle camera implements recognition based on five points. On this basis, the quantity of distinctive marks 2 may be equal to the quantity of heating members 3, which are both five. That is, M may be 5 and N may also be 5, thereby improving applicability of the in-vehicle camera. Further, five distinctive marks 2 and five through holes 121 corresponding to the heating members 3 may be disposed at equal intervals on the housing along the vertical direction. For example, two distinctive marks 2, one through hole 121, one distinctive mark 2, one through hole 121, one distinctive mark 2, two through holes 121, one distinctive mark 2, and one through hole 121 are sequentially disposed at equal intervals from top to bottom, where the equal interval may be 12.5 mm.

Certainly, there may be another sequencing manner of the distinctive marks 2 and the through holes 121. For example, at least two distinctive marks 2 or at least two through holes 121 may be arranged successively, where the distance between adjacent distinctive marks 2 or adjacent through holes 121 may be equal. Alternatively, the distinctive marks 2 and the through holes 121 may be arranged at intervals. That is, one or more distinctive marks 2 may be disposed between two through holes 121, or one or more through holes 121 may be disposed between two distinctive marks 2.

The distinctive mark 2 and the through hole 121 may be disposed on the covering plate 12 together, or one of the distinctive mark 2 and the through hole 121 is disposed on the covering plate 12, and the other is disposed on the housing 11.

Specifically, the body 1 may be a thin-wall-shaped structure, and may include a housing 11 and a covering plate 12 covered on the housing 11. The housing 11 and the covering plate 12 may jointly form an accommodating cavity. Preferably, the housing 11 may include a bottom surface disposed along the vertical direction and side surfaces connected to the bottom surface, where the bottom surface is a surface parallel to the covering plate 12, and the two side surfaces are respectively connected to the bottom surface and the covering plate 12. The covering plate 12 may also extend along the vertical direction. The vertical direction in this embodiment of the present invention is a direction perpendicular to the horizontal plane. There may be various connecting manners between the covering plate 12 and the housing 11, such as screw joint, bonded connection, and the like. The covering plate 12 may also be clamped onto the housing 11 to facilitate disassembly.

The covering plate 12 and the housing 11 may also be made of various materials. The covering plate 12 and the housing 11 may be manufactured with a common processing method by using materials which can be obtained in the prior art. For example, the covering plate 12 and the housing 11 may be processed by adopting metal materials (such as an iron material and a copper material) through molding or smithing. For another example, the covering plate 12 and the housing 11 may be made of plastic by means of injection molding, which is not specifically limited herein. In addition, the material of the covering plate and the housing 11 may be the same or may be different. The covering plate 12 and the housing 11 may be both made of a plastic material, thereby enhancing the waterproof performance of the body 1. Alternatively, the covering plate 12 and the housing 11 are both made of a metal material, a surface of the metal material being covered with an insulation material, to achieve a waterproof effect.

The distinctive mark 2 may be fixed on the external surface, away from the accommodating cavity, of the covering plate 12, thereby facilitating recognition. The heating member 3 may be disposed in the accommodating cavity, to prevent the heating member 3 from being exposed in the air and being damaged. In addition, the heating member 3 may be a PTC heating member, which is not greatly affected by the external environment, so that the temperature can be maintained at 60±5° C. The PTC heating member may be connected to the power supply unit through two electrical connection wires. The covering plate 12 may further be provided with a through hole 121 at a position directly facing the heating member 3. Heat of the heating member 3 may be dissipated to the outside of the accommodating cavity through the through hole 121 in time, so that the heating member 3 can be detected by an infrared camera 012. M through holes 121 may also be arranged along the second direction, so that the through holes 121 are in one-to-one correspondence with the heating members 3, and heat of the heating members 3 may be sent out through the through holes 121 corresponding to the heating members 3.

Further, the through hole 121 may be a circular hole, which facilitates processing and recognition. A waterproof transparent membrane may be disposed in the through hole 121, or a waterproof transparent membrane covering the through hole 121 may be disposed on a surface of the covering plate 12. Therefore, the waterproof performance of the body 1 is improved, and dissipation of heat may not be affected. The waterproof transparent membrane may be a material such as glass, plastic, resin, and the like which can prevent permeation of humidity and allow infrared light to pass. As another implementation, the waterproof transparent membrane covering the through hole 121 may also be disposed on the surface of the covering plate 12. The waterproof transparent membrane may be disposed on an internal surface or an external surface of the covering plate, to achieve the waterproof effect.

In addition, for ease of fixation of the heating member 3, the body 1 further includes a fixing base 4. The fixing base 4 is accommodated in the accommodating cavity. The fixing base 4 is provided with a connecting portion and a mounting portion. The mounting portion is configured to connect the heating member 3. The connecting portion is configured to connect the mounting portion and the body 1. The quantity of fixing bases 4 may be equal to the quantity of heating members 3. Alternatively, the body 1 includes one fixing base 4, and the quantity of mounting portions in the fixing base 4 is equal to the quantity of heating members 3.

Specifically, the fixing base 4 may be made of a metal or plastic material, which is not specifically limited herein. The fixing base 4 may be made of a poor conductor material of heat, thereby improving heating efficiency and reducing attenuation of heat. The fixing base 4 may fix the heating member 3 in the accommodating cavity, to increase the degree of firmness of the heating member 3. A connecting portion and a mounting portion may be formed on the fixing base 4. The connecting portion 12 may be a first clamping member, such as a buckle. A second clamping member cooperating with the first clamping member may be disposed on an internal surface of the covering plate 12 or the bottom surface, such as a hook. Therefore, the fixing base 4 is clamped on the internal surface of the covering plate 12 or the bottom surface. The mounting portion may be a webbing belt disposed on the fixing base 4, which can bind and fix the heating member 3 on the fixing base 4. Alternatively, the mounting portion may be fixedly connected to the heating member 3 in other manners, such as bonding, clamping, or abutting, which is not limited herein.

When the quantity of fixing bases 4 is equal to the quantity of heating members 3, a mounting location of each fixing base 4 in the accommodating cavity is related to the location of the through hole 121 corresponding to the heating member 3 fixed by the fixing base 4. For example, a mounting height of the fixing base 4 is equal to a mounting height of the through hole 121, so that after being mounted on the fixing base 4, the heating member 3 may send out heat or emit infrared light through the corresponding through hole 121. Further, the mounting location of the fixing base 4 may allow the heating member 3 to directly face the through hole 121. That is, main heating energy of the heating member 3 may be all dissipated through the through hole, thereby improving the working efficiency of the heating member 3, so that the in-vehicle infrared camera can detect the heating member more easily.

Similarly, when one fixing base 4 is disposed in the body, a setting location of the mounting portion in the fixing base 4 is related to a location of the through hole 121 corresponding to the heating member 3 connected to the mounting portion. For example, a mounting height of the mounting portion is equal to a height of the corresponding through hole 121.

In addition, the connecting portion may be fixedly connected to the covering plate 12; alternatively, the connecting portion may be fixedly connected to the housing 11, to fix the mounting portion on the covering plate 12 or the housing 11, which may be selected according to an actual situation.

In an implementation, the connecting portion includes a connecting screw hole 41. The connecting portion and the body 1 are connected through a first bolt, to facilitate mounting the fixing base 4. Further, there may be a plurality of connecting screw holes 41. The connecting screw holes 41 are arranged at intervals in a preset direction. The preset direction may be a straight line direction or may be a curved line direction. Preferably, there may be four connecting screw holes 41, which may be arranged on the fixing base 4 in a matrix with two rows and two columns, to enhance the degree of firmness.

Further, the mounting portion may include a groove 42 configured to accommodate the heating member 3. The heating member 3 may be fixed in the groove 42, in a manner such as clamping, bonding, or abutting by using bolts.

The groove 42 may be a square groove or a circular groove, and the specific shape may be set according to the shape of the heating member 3. Preferably, the groove 42 includes two side walls 421 arranged opposite to each other and a bottom wall 422. The heating member 3 is fixedly connected to the groove 42. The groove 42 may include a bottom wall 422 and side walls 421. The bottom wall 422 may be disposed parallel to the internal surface of the covering plate 12, and the side walls 421 may be disposed perpendicular to the bottom wall 422. The heating member 3 may be fixed on the bottom wall 422 or the side wall 421. For example, the heating member 3 may be bonded to the bottom wall 422 or the side wall 421, so that a heating surface of the heating member 3 can be disposed facing the through hole 121.

Further, the groove may further be provided with a limiting portion 423. The limiting portion 423 is configured to prevent the heating member 3 from being in contact with the bottom wall 422, to prevent the heating member 3 from dissipating heat through the bottom wall 422, thereby reducing heat loss of the heating member.

In an implementation, the limiting portion 423 is disposed on the bottom wall 422, where a length h1 of the limiting portion is less than a length h2 of the bottom wall. The heating member 3 is connected to the limiting portion 423.

Further, as shown in FIG. 5, two ends of the bottom wall 422 are each provided with one limiting portion 423. One side of the limiting portion 423 is connected to one side wall 421 of the two side walls 421 arranged opposite to each other. A bottom portion of the limiting portion 423 is connected to the bottom wall 422. A top portion of the limiting portion 423 is connected to a lower surface 32 of the heating member, to prevent the heating member from being in contact with the bottom wall 422, and further prevent the heating member from dissipating heat through the bottom wall 422 during heating, thereby realizing an effect of reducing the heat loss of the heating member 3.

In this case, a length h3 of one side of the limiting portion 423 is less than a length h4 of the side wall. Further, the length h4 of the side wall may be equal to a sum of a length of a side surface of the heating member and the length h3 of one side of the limiting portion. In this way, an upper surface 31 of the heating member may be in the same plane with an upper surface of the connecting portion, to further ensure the degree of firmness of the fixed connection implemented between the connecting portion and the body by the fixing base.

Further, each side wall 421 is further provided with a threaded through hole 4211, a second bolt passes through the threaded through hole 4211, and an end of screw rod of the second bolt 4211 abuts against a surface, connected to the side wall, of the heating member 3. Therefore, the heating member 3 is abutted from two ends, so that the heating member 3 is fixed in the groove 42.

In another implementation, the limiting portion 423 is disposed on the side wall 321. Each side wall 421 is provided with one limiting portion 423. By means of the fixed connection between the limiting portion 423 and the heating member 3, the lower surface 32 of the heating member is prevented from being in contact with the bottom wall 422.

In addition, to ensure normal working of the heating member 3, the body 1 further includes a power supply unit. The power supply unit and the heating member 3 are connected through an electrical connection wire. The power supply unit may be a device that can supply electrical energy in the prior art. For example, the power supply unit may include a power supply or a power supply interface. The power supply may supply power for the heating member 3, and may be a device such as a battery or a mobile power supply. The power supply interface may be configured to connect to an external power supply, to allow the external power supply to supply power to the heating member 3, so that the calibration apparatus may use various kinds of power supplies and has good universality. Besides, the power supply interface may be covered by a waterproof housing, to improve the waterproof performance of the calibration apparatus. In addition, one or more power supply units may be provided. One power supply unit can supply power for a plurality of heating members 3 simultaneously, or a plurality of power supply units may be electrically connected to the heating members 3 respectively, to further select a heating member 3 that needs power supply according to a requirement, thereby improving the universality of the calibration apparatus.

The electrical connection wire may be a common conductive structure in the prior art, and may connect the power supply unit and the heating member 3, to supply power for the heating member 3.

Further, the body 1 further includes a switch respectively connected to the power supply unit and the heating member 3, and the switch is configured to control a working state of the heating member 3. That is, a switch may be disposed between the power supply unit and the heating member 3. The switch can control whether a current passes through the heating member 3, to make the heating member in a heating state or a non-heating state. Optionally, the switch may further control the magnitude of the current of the heating member 3, thereby changing the heating power of the heating member 3.

This embodiment further provides a connection manner in which the body 1 is connected to a horizontal ground. The calibration apparatus for an in-vehicle camera further includes a base 5 fixedly connected to the body 1. The base 5 is disposed perpendicular to the body 1, to make the body 1 perpendicular to a horizontal plane.

Specifically, the base 5 may extend along a horizontal direction. The body 1 may be vertically fixed at a top surface of the base 5. There may be various specific fixing manners, such as soldering, screw joint, or clamping. The base 5 may also be of various structures. For example, the base 5 may be of a frame-shaped structure or a block-shaped structure, and a shape of the base 5 may be square or circular, which is not specifically limited herein. The base 5 may improve the stability of the body 1, to prevent the body 1 from moving and affecting the result during calibration.

As a preferred implementation of the base 5, the base 5 includes a level adjustment apparatus 6. The level adjustment apparatus 6 is configured to adjust a level angle of the base. When the base 5 is placed on a plane inclined relative to the horizontal plane, a level degree of the base 5 may be changed by adjusting the level adjustment apparatus 6, which can enhance the applicability of the calibration apparatus, to make the calibration apparatus adapt to different calibration environments. The level adjustment apparatus 6 may also be of various structures. For example, the level adjustment apparatus 6 may include a base plate in contact with the ground and an adjusting plate rotatably connected to the base plate. The body 1 may be fixed to the adjusting plate. The vertical extent of the body 1 may be changed by adjusting an angle between the base plate and the adjusting plate.

Optionally, the level adjustment apparatus 6 includes a handle 61 and a screw rod portion 62. The handle 61 is fixedly mounted at one end of the screw rod portion 62. The handle 61 is located above the base 5, for ease of rotating the level adjustment apparatus 6. The screw rod portion 62 passes through the base 5. The screw rod portion 62 fits with the base 5. The screw rod portion 62 is vertically disposed.

Specifically, the handle 61 may protrude from the screw rod portion 62 along a circumferential direction for ease of holding. The handle 61 may be circular or polygonal. The screw rod portion 62 may vertically pass through the base 5, or may be screw-jointed with the base 5. A length of the screw rod portion 62 passing through the base 5 may be adjusted by adjusting the handle 61, thereby changing the level angle of the base 5. The structure is simple, adjustment is convenient, and implementation is easy.

Further, the base 5 further includes a gradienter. The gradienter is mounted on the base 5 and is configured to detect whether the base is disposed horizontally, thereby ensuring the vertical extent of the body 1 and improving accuracy of the calibration result.

This embodiment further provides a calibration system for an in-vehicle camera, including a vehicle and a calibration apparatus for an in-vehicle camera. A common camera and an infrared camera are disposed in the vehicle. The calibration apparatus for an in-vehicle camera is fixed at a preset distance in front of the vehicle along a driving direction. The distinctive mark 2 and the heating member 3 are disposed toward the vehicle.

Specifically, the vehicle may have a common vehicle structure in the prior art. The in-vehicle camera may include a common camera and an infrared camera. The common camera may be a common camera using a principle of image recognition in the prior art. The infrared camera may be a common camera using a principle of infrared thermal imaging in the prior art.

The calibration apparatus for an in-vehicle camera may be disposed in front of the driving direction of the vehicle, and may be at a preset distance to the front bumper of the vehicle. The preset distance may be of various values. Optionally, the distance may be 5 m, thereby facilitating calibration. In addition, the distinctive mark 2 and the heating member 3 may be disposed toward the vehicle, so that the common camera 011 and the infrared camera 012 can detect the distinctive mark 2 and the heating member 3, which facilitates calibration.

During calibration the calibration: apparatus for an in-vehicle camera may be disposed at a preset distance in front of the vehicle in advance. The distinctive mark 2 and the heating member 3 may face the vehicle. The temperature of the body 1 is equal to the ambient temperature, and the temperature of the heating member 3 disposed on the body may be higher than the ambient temperature. The infrared camera 012 can detect the heating member 3, thereby determining a position of the body 1. The distinctive mark 2 may be different from the body 1 so as to be detected by the common camera 011, thereby determining the position of the body 1. Therefore, the calibration apparatus for an in-vehicle camera may calibrate the common camera 011 and the infrared camera 012 simultaneously.

According to the calibration system for an in-vehicle camera provided in this embodiment, at least one distinctive mark arranged at intervals along the first direction and at least one heating member arranged at intervals along the second direction are disposed on the body. During calibration, a common camera 011 can detect the distinctive mark, and therefore, the common camera 011 is calibrated. The heating member may generate heat so as to be detected by an infrared camera 012, and therefore, the infrared camera 012 is calibrated. In this way, the common camera 011 and the infrared camera 012 can be calibrated simultaneously in one calibration operation; the operation is simple and convenient.

This embodiment farther provides a calibration method for an in-vehicle camera, applied to the calibration system for an in-vehicle camera described above, including: placing a calibration apparatus for an in-vehicle camera at a preset distance in front of a front bumper of a to-be-detected vehicle, so that a surface, including a distinctive mark and a heating member, of the calibration apparatus for an in-vehicle camera faces the front bumper of the to-be-detected vehicle; calibrating a common camera 011 in the to-be-detected vehicle by using the distinctive mark; and controlling the heating member to generate heat, and when temperature of the heating member is greater than or equal to a preset temperature threshold, calibrating an infrared camera 012 in the to-be-detected vehicle. The calibration method for an in-vehicle camera may be applied to the foregoing calibration system. The structure and functions of the calibration apparatus for an in-vehicle camera are the same as those of the foregoing embodiment. For details, reference may be made to the foregoing embodiment, which is not repeated herein again. The preset temperature threshold may be a temperature threshold that can be detected by the infrared camera 012, and may be set according to an actual situation.

According to the calibration method for an in-vehicle camera provided in this embodiment, the calibration apparatus for an in-vehicle camera is disposed at a preset distance in front of the front bumper of the vehicle, and a surface including the distinctive mark and the heating member faces the front bumper of the to-be-detected vehicle. During calibration, the common camera 011 can detect the distinctive mark, and therefore, the common camera 011 is calibrated; the heating member may generate heat so as to be detected by the infrared camera 012, and therefore, the infrared camera 012 is calibrated. In this way, the common camera 011 and the infrared camera 012 can be calibrated simultaneously in one calibration operation; the operation is simple and convenient In the present invention, terms "first" and "second" are merely used for description, and cannot be understood as indicating or implying relative importance. Directions or location relationship indicated by terms "upper", "lower", "top", and "bottom" are based on the directions or location relationship shown in the accompanying drawings, which are merely used for ease of description of the present invention rather than indicating or implying that the indicated apparatus or element needs to have a specific direction and be constructed and operated in a specific direction. Unless otherwise specifically specified and limited, terms such as "mounting" and "connection" should be understood broadly, and for example, the "connection" may be fixed connection, or detachable connection, or integral connection. For a common technician skilled in this art, specific meanings of the foregoing terms in the present invention may be understood according to a specific situation.

In the description of the specification, descriptions of reference terms such as "one implementation", "some implementations", "exemplary implementation", "example", "specific example", or "some examples" refer to that specific characteristics, structures, materials, or features described with reference to an implementation or an example are included in at least one implementation or example of the present invention. In this specification, schematic descriptions of the foregoing terms do not necessarily refer to the same implementation or example. In addition, the described specific characteristics, structures, materials, or features may be combined in a suitable manner in any one or more implementations or examples.

In the end, it should be noted that, the foregoing embodiments are merely used for describing the technical solution of the present invention, and is not intended to limit the present invention. Although the present invention is described in detail with reference to the foregoing embodiments, a common technician skilled in this art should understand that modifications may still be performed on the technical solution recorded in the foregoing embodiments, or equivalent replacements may be performed on some or all of the technical characteristics, and these modifications or replacements shall not make the essence of the corresponding technical solution depart from the scope of the technical solutions of the embodiments of the present invention.

What is claimed is:

1. A calibration apparatus for an in-vehicle camera, comprising:
   a body, at least one distinctive mark arranged at intervals along a first direction and at least one heating member arranged at intervals along a second direction being disposed on the body, wherein
   the distinctive mark is configured to be detected by a common camera in a to-be-detected vehicle, and the heating member is configured to generate heat so as to be detected by an infrared camera in the to-be-detected vehicle;
   wherein the body comprises:
   a housing and a covering plate covered on the housing, the covering plate and the housing forming an accommodating cavity after being, connected, wherein
   the distinctive mark is disposed on an external surface, away from the accommodating cavity, of the covering plate;
   the heating member is fixed in the accommodating cavity;
   through holes arranged along the second direction are formed on the covering plate;
   each through hole corresponds to one heating member, and each heating member corresponds to one through hole; and
   heat of the heating member is sent out through the through hole corresponding to the heating member.

2. The calibration apparatus according to claim 1, wherein the distinctive mark is a ring-shaped structure.

3. The calibration apparatus according to claim 2, wherein the first direction and the second direction are the same.

4. The calibration apparatus according to claim 1, wherein the through hole is a circular hole.

5. The calibration apparatus according to claim 1, wherein a waterproof transparent film is disposed in the through hole.

6. The calibration apparatus according to claim 1, wherein a waterproof transparent film covering the through hole is disposed on a surface of the covering plate.

7. The calibration apparatus according to claim 1, wherein the body further comprises a fixing base;
   the fixing base is accommodated in the accommodating cavity, the fixing base being provided with a connecting portion and a mounting portion; and
   the mounting portion is configured to connect the heating member, and the connecting portion is configured to connect the mounting portion and the body.

8. The calibration apparatus according to claim 1, wherein the body further comprises a power supply unit; and
   the power supply unit is connected to the heating member through an electrical connection wire.

9. The calibration apparatus according to claim 8, wherein the body further comprises:
   a switch respectively connected to the power supply unit and the heating member; and
   the switch is configured to control a working state of the heating member.

10. The calibration apparatus according to claim 8, wherein the power supply unit comprises a power supply or a power supply interface; and
    the power supply interface is configured to connect an external power supply, to allow the external power supply to supply power to the heating member.

11. The calibration apparatus according to claim 7, wherein the connecting portion is fixedly connected to the covering plate; or,
    the connecting portion is fixedly connected to the housing.

12. The calibration apparatus according to claim 7, wherein the connecting portion comprises a connecting screw hole, the connecting portion and the body being connected by using a first bolt.

13. The calibration apparatus according to claim 7, wherein the mounting portion comprises a groove configured to accommodate the heating member.

14. The calibration apparatus according to claim 13, wherein the groove comprises two side walls arranged opposite to each other and a bottom wall, and the heating member is fixedly connected to the groove.

15. The calibration apparatus according to claim 14, wherein the groove is provided with a limiting portion, and the limiting portion is configured to prevent the heating member from being in contact with the bottom wall.

16. The calibration apparatus according to claim 15, wherein the limiting portion is disposed on the bottom wall;
    a length of the limiting portion is less than a length of the bottom wall; and
    the heating member is connected to the limiting portion.

17. The calibration apparatus according to claim 16, wherein two ends of the bottom wall is each provided with one limiting portion; and
    one side of the limiting portion is connected to one side wall of the two side walls arranged opposite to each other.

18. The calibration apparatus according to claim 17, wherein a length of the side of the limiting portion is less than a length of the side wall.

19. The calibration apparatus according to claim 15, wherein each side wall is provided with a threaded through hole, a second bolt passes through the threaded through hole, and an end of a screw rod of the second bolt abuts against a surface of the heating member.

* * * * *